(12) United States Patent
Braun et al.

(10) Patent No.: US 10,782,088 B2
(45) Date of Patent: Sep. 22, 2020

(54) BOW FISHING REEL WITH REDUCED FRICTION PAYOUT

(71) Applicant: AMS, LLC, Stratford, WI (US)

(72) Inventors: Jeff Braun, Stratford, WI (US); Tim Morines, Abbotsford, WI (US)

(73) Assignee: AMS, LLC, Stratford, WI (US)

( * ) Notice: Subject to any disclaimer, the term of this patent is extended or adjusted under 35 U.S.C. 154(b) by 274 days.

(21) Appl. No.: 15/886,106

(22) Filed: Feb. 1, 2018

(65) Prior Publication Data

US 2019/0063866 A1    Feb. 28, 2019

Related U.S. Application Data

(63) Continuation-in-part of application No. 15/689,105, filed on Aug. 29, 2017, now Pat. No. 10,499,622.

(51) Int. Cl.
| | |
|---|---|
| *F41B 5/14* | (2006.01) |
| *A01K 97/12* | (2006.01) |
| *A01K 89/08* | (2006.01) |
| *A01K 89/00* | (2006.01) |
| *A01K 89/015* | (2006.01) |

(52) U.S. Cl.
CPC .......... *F41B 5/1488* (2013.01); *A01K 89/006* (2013.01); *A01K 89/0182* (2015.05); *A01K 89/01925* (2015.05); *A01K 89/08* (2013.01); *A01K 97/125* (2013.01)

(58) Field of Classification Search
CPC ................ A01K 81/00; A01K 81/0102; A01K 81/0108; A01K 81/081; F41B 5/1488
See application file for complete search history.

(56) References Cited

U.S. PATENT DOCUMENTS

| | | | | |
|---|---|---|---|---|
| 2,938,514 A | * | 5/1960 | Berg | F41B 5/1488 |
| | | | | 124/88 |
| 3,949,730 A | * | 4/1976 | Schoenberger | F41B 5/1488 |
| | | | | 124/23.1 |
| 4,383,516 A | | 5/1983 | LaSee | |
| 4,674,471 A | * | 6/1987 | Lance | A01K 81/00 |
| | | | | 124/86 |
| 5,143,044 A | * | 9/1992 | Bourquin | F41B 5/1488 |
| | | | | 124/86 |
| 5,649,527 A | * | 7/1997 | Olsen | F41B 5/1426 |
| | | | | 124/86 |
| 6,375,107 B1 | | 4/2002 | Wong | |
| 6,634,350 B2 | | 10/2003 | LaSee | |
| 6,796,522 B2 | * | 9/2004 | Braun | A62B 1/06 |
| | | | | 226/177 |
| 7,594,352 B2 | | 9/2009 | Holmberg | |
| 8,024,884 B2 | | 9/2011 | Holmberg | |
| 8,567,382 B2 | | 10/2013 | Kingsbury et al. | |
| 8,839,776 B2 | | 9/2014 | Kingsbury et al. | |
| D746,397 S | | 12/2015 | Kingsbury | |

(Continued)

*Primary Examiner* — Emmanuel M Marcelo
(74) *Attorney, Agent, or Firm* — Boyle Fredrickson S.C.

(57) ABSTRACT

A reel suitable for bow fishing and the like provides a cowling covering a reel with a wide opening to reduce frictional restraint on high-speed paying out of the line with the flight of the arrow. An optional guide arm may be used to minimize line diversion and hence friction during line payout while absorbing forces when the line is retracted permitting use of a lighter cowling design without loss of strength. A high torque bevel gear transmission and safety lighting is further provided.

14 Claims, 12 Drawing Sheets

(56) References Cited

U.S. PATENT DOCUMENTS

| | | | |
|---|---|---|---|
| 9,220,249 B1* | 12/2015 | Bailey | A01K 81/04 |
| 9,383,160 B1* | 7/2016 | White | A01K 89/006 |
| 9,560,840 B2 | 2/2017 | Braun et al. | |
| D790,657 S | 6/2017 | Noble et al. | |
| 9,970,729 B1* | 5/2018 | Coalson | F42B 6/04 |
| 10,433,532 B1* | 10/2019 | Bagby | A01K 89/0122 |
| 10,499,622 B2* | 12/2019 | Braun | A01K 89/0102 |
| 2011/0278860 A1* | 11/2011 | Lupinacci | H02N 11/00 |
| | | | 290/1 R |
| 2012/0285430 A1 | 11/2012 | Dunlop et al. | |
| 2014/0090287 A1* | 4/2014 | Olson | A01K 97/01 |
| | | | 43/17 |
| 2014/0332615 A1* | 11/2014 | Braun | A01K 89/0108 |
| | | | 242/236 |
| 2015/0024880 A1* | 1/2015 | Pedersen | F41B 5/1488 |
| | | | 473/575 |
| 2015/0354915 A1* | 12/2015 | Woods, Jr. | F41B 5/1488 |
| | | | 124/86 |
| 2017/0027145 A1 | 2/2017 | Braun et al. | |
| 2017/0295768 A1 | 10/2017 | Noble et al. | |
| 2017/0367310 A1* | 12/2017 | Braun | A01K 89/0102 |
| 2019/0063866 A1* | 2/2019 | Braun | A01K 89/0182 |

* cited by examiner

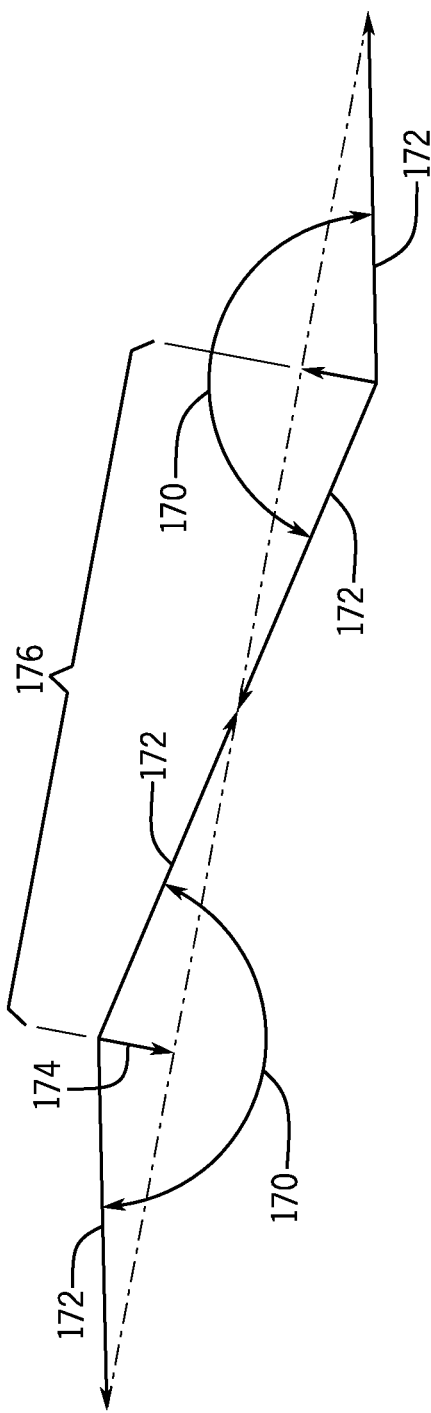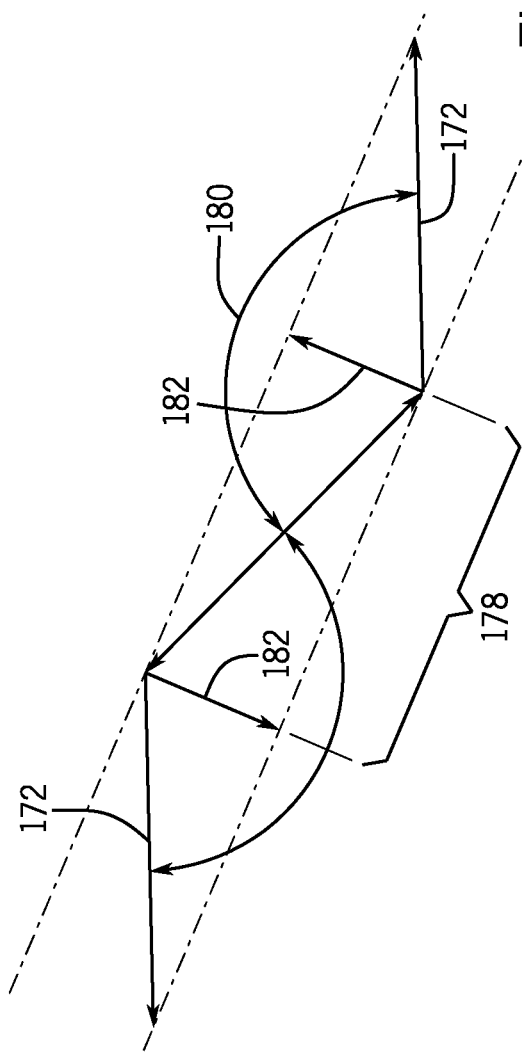

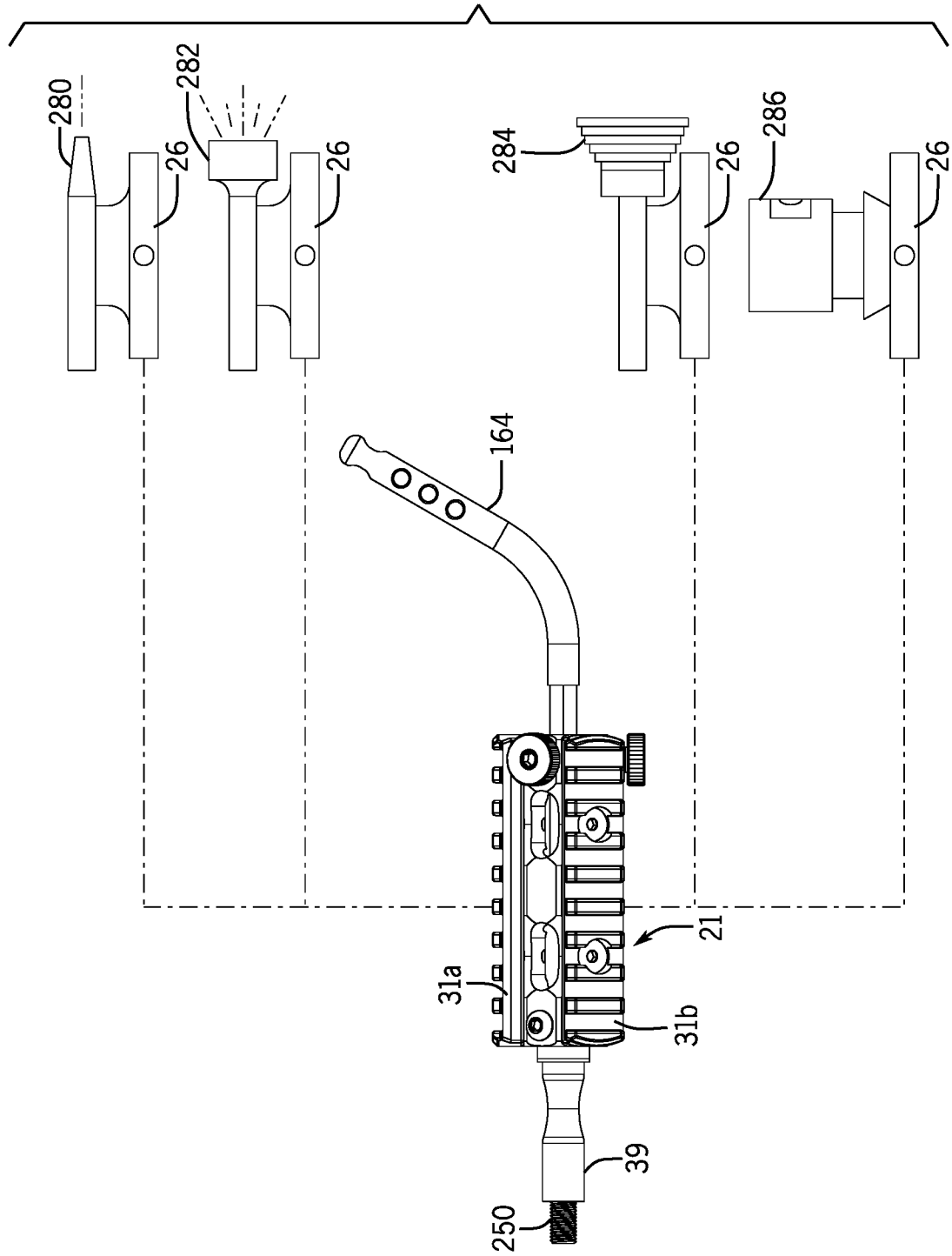

BOW FISHING REEL WITH REDUCED FRICTION PAYOUT

CROSS REFERENCE TO RELATED APPLICATIONS

This application is a continuation-in-part application of application Ser. No. 15/689,105, filed Aug. 29, 2017, and hereby incorporated by reference.

BACKGROUND OF THE INVENTION

The present invention relates to a reel for winding and storing fishing line or the like and more particularly to a reel that provides rapid payout of the fishing line, for example, as required when the reel is used for bow fishing.

In bow fishing, an arrow is fitted with a lightweight but sturdy line which may pay out behind the arrow when the arrow is shot from a bow. The line allows the arrow, and/or arrow and fish, to be retrieved after the shot.

It is important that the line be stored without tangling before release of the arrow and yet be able to pay out rapidly with little resistance when the arrow is released. Conventional reels which rotate to wind or unwind line present substantial rotational inertia that can interfere with free flight of the arrow.

These problems of line storage and release are addressed in a novel bow fishing reel described in U.S. Pat. No. 4,383,516, assigned to the assignee of the present invention, in which the line is loosely coiled in a bottle. After the line is pulled from the bottle by the arrow, opposed rubber rollers at the mouth of the bottle clamp together about the line and push it into the bottle under the urging of a geared crank handle. The line is stored without winding in a loose mass within the bottle that nevertheless resists tangling.

An alternative to the above design can be found in conventional spin casting reels, which are sometimes used for bow fishing, for example, the type described in U.S. Pat. No. 6,375,107, in which the axis of the spool about which the line is wound is parallel to the direction that the line pays out after arrow release. As the line pays out, the line slips over the edge of the reel unwinding without rotation of the reel or the need to overcome a corresponding rotational inertia of the reel. A cowling fits over the reel and provides a central aperture for corralling the line along a center line of the reel when it is wound back on the reel.

SUMMARY OF THE INVENTION

The present inventors have recognized that in bow fishing, deflection of the line, as it pays over the edge of the reel and passes through the cowling opening to follow a high-speed arrow, can substantially impede the line reducing arrow distance and velocity. To remedy this problem, the invention provides a bow fishing reel having an extremely wide aperture cowling substantially eliminating contact between the cowling and the line as the line pays out. In one embodiment, an additional outrigger guide arm works in tandem with the wide aperture to prevent contact between the line and aperture. The outrigger arm may extend in front of the aperture by substantial distance to limit the deflection angles of the line around the reel and outrigger arm aperture, further reducing line friction.

Specifically, then, the present invention in one embodiment provides a fishing line reel having a frame adapted for attachment to a bow and a line spool rotatable with respect to the frame about a first axis to wind fishing line on the line spool around the first axis. The line spool provides a front rim extending radially about the first axis and the fishing line passes over the front rim during payout of the fishing line. A winder having a crank arm rotatable by a user may rotate the line spool around the first axis, and a cowling may be supported by the frame to surround the line spool, the cowling having an opening at a first end to allow payout of the fishing line along the first axis. The opening in the cowling maybe substantially equal in diameter to a diameter of the front rim of the reel.

It is thus a feature of at least one embodiment of the invention to reduce deflection of the line by the cowling thereby minimizing frictional contact between the bow fishing line and the cowling during rapid payout of the bow fishing line during the flight of the arrow.

The reel may further include a guide arm supported by the frame and having a portion extending beyond the opening of the cowling along the first axis to receive the fishing line therethrough guiding the fishing line to prevent contact between the opening and the fishing line when the fishing line is in tension.

It is thus a feature of at least one embodiment of the invention to eliminate contact between the cowling and the line when the line is under tension reducing unnecessary friction on the line and allowing a lighter cowling design.

The guide arm maybe positioned so that the fishing line in tension is diverted by the guide arm by a deflection angle with respect to the first axis of greater than 135 degrees and desirably greater than 150 degrees.

It is thus a feature of at least one embodiment of the invention to reduce contact normal forces and thus friction by avoiding sharp deflection angles.

The diameter of the opening in the cowling maybe greater than 1.5 inches and/or the opening in the cowling may be at least 50 percent of the cowling diameter. In one embodiment, the line spool may have a front rim extending radially about the first axis, and the fishing line may pass over the front rim during payout of the fishing line, and the opening may be substantially equal in diameter to a diameter of the front rim.

It is thus a feature of at least one embodiment of the invention to provide a wide opening cowling allowing release of the fishing line over the edge of the reel for high-speed payout without the need for overcoming reel inertia.

The guide arm may attach to the frame without direct contact with the cowling.

It is thus a feature of at least one embodiment of the invention to remove forces from the cowling allowing a lighter weight cowling design.

The guide arm may receive the fishing line through an aperture in a distal end of the guide arm removed from the frame and aligned with the first axis.

It is thus a feature of at least one embodiment of the invention to center the fishing line with the rotation axis of the reel for improved line payout and winding.

The crank arm may communicate with the line spool through a mechanical path through first and second perpendicular shafts each holding mutually engaging bevel gears, and an end of the first perpendicular shaft may be supported by a circumferential groove positioned on the second perpendicular shaft against forces of separation of the bevel gears.

It is thus a feature of at least one embodiment of the invention to provide a more robust right-angle drive allowing convenient placement of the crank to the side of the reel by supporting the shaft holding one bevel gear at both ends of the shaft instead of in a cantilevered fashion normally required because the shaft axes intersect.

The first perpendicular shaft may be supported against the second perpendicular shaft via a metal ball received in a socket in the end of the first perpendicular shaft and in the groove of the second perpendicular shaft.

It is thus a feature of at least one embodiment of the invention to provide a low friction "floating support" allowing the use of the second shaft to support the first shaft in a small space where conventional journal bearings would not be practical.

The fishing line reel may include a line catch for catching the fishing line to wind the fishing line about the line spool with rotation of the crank arm when the line catch is in an engaged position and for freeing the fishing line so that the fishing line does not wind about the line spool with the rotation of the crank arm when the line guide is in an unengaged position. A handle may extend from a rear of the housing substantially along the first axis and may be operable by the user to move the line guide from the unengaged position to the engaged position when the handle moves between a released position and an actuated position, and the handle may be a T-handle providing finger grip portions extending in opposite directions perpendicular to the axis and may include a pivot allowing the finger grip portions to swing within a vertical plane to align with a force applied by a user's fingers to the finger grip portions.

It is thus a feature of at least one embodiment of the invention to provide two-fingered engagement of the handle while improving user comfort by accommodating any slight angular offset between the applied force and the first axis.

The fishing line reel may include a brake system applying a sliding frictional force to the line spool when the handle is in the actuated position, the sliding frictional force being controlled by movement of a user accessible operator. The brake system may include a toothed clutch connecting the rear rim to a brake disk when the handle moves to an actuated position, the brake disk slidably engaging a stationary pad fixed with respect to the frame and pressing against the brake disk according to movement of the operator.

It is thus a feature of at least one embodiment of the invention to provide control of the reel friction independent of engagement of the clutch so that the reel may be quickly actuated by the T-handle to a predetermined level of frictional slippage.

The crank arm may include a rotatable crank knob for grasping by a user and may further include a battery-powered lamp within at least one of the cowling and the rotatable crank knob.

It is thus a feature of at least one embodiment of the invention to provide improved visibility of the components of the reel, for example, during twilight or nighttime fishing or both.

These particular objects and advantages may apply to only some embodiments falling within the claims and thus do not define the scope of the invention.

BRIEF DESCRIPTION OF THE DRAWINGS

FIGS. 6*a* and 6*b* are vector force diagrams showing the reduced cross axial and hence frictional forces provided by the arrangement of FIG. 5;

FIG. 15 is schematic view of the mounting fixture receiving a laser, light, line puller and camera attachment.

DETAILED DESCRIPTION OF THE PREFERRED EMBODIMENT

Figure 1:
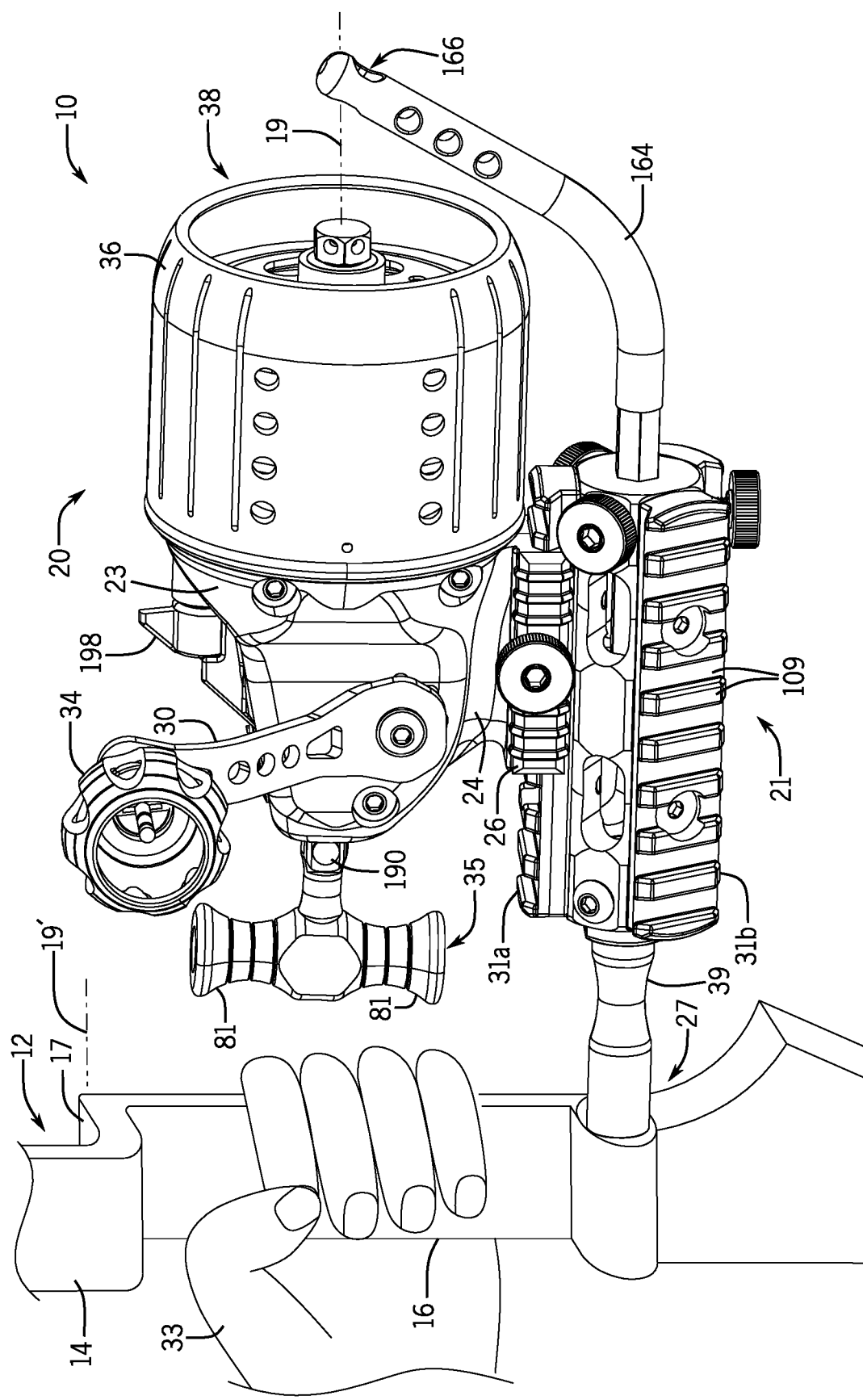
FIG. 1 is a fragmentary perspective view of a bow riser portion of a bow having the reel of the present invention attached thereto by means of an adjustable mounting system.

Referring now to FIG. 1, a bow fishing bow 10 may include a bow frame 12 presenting a bow riser 14 providing a grip 16 for gripping by the bow hand of the user 33. The bow riser 14 may provide an arrow shelf 17 above the grip 16 for supporting the arrow shaft (not shown) before release of the arrow for travel generally along axis 19'.

A fishing line reel 20 for storing and paying out fishing line 22 may be attached to the bow riser 14 near the grip 16 by means of a mounting fixture 21 to be positioned generally proximate to and in front of the bow riser 14 to provide a payout axis 19' generally parallel to axis 19. The fishing line 22 used in this capacity may be, for example, a braided rather than monofilament line, for example, a braided Spectra roughly ⅟₃₂ inches in diameter or smaller ranging from 50-pound test to 200-pound test, that may be readily distinguished from, for example, a fly casting line by its greater strength and substantially greater outer diameter.

The fishing line reel 20 may have a reel housing 23 providing a frame attached to a vertically descending mount 24 attached to lower clamp jaws 26. The clamp jaws 26 connect with a picatinny rail 31*a* of the mounting fixture 21 being one of three picatinny rails 31*a-c* available on the mounting fixture 31 as will be discussed below. The mounting fixture 21 may be attached to a mounting bar 39 extending forward from the riser 14 below the grip 16 and attached to the riser 14 by means of a threaded bore 27 extending therethrough generally parallel to axis 19'. The mounting fixture 21 will be discussed in greater detail below.

The reel housing 23 is positioned to allow the fishing line 22 extending along an axis 19 parallel to axis 19' to be proximately below but vertically aligned with axis 19'. Ideally the axis 19' of the fishing line 22 is roughly centered on the grip 16 significantly limiting torque on the grip 16 when tension is applied to the fishing line 22.

A spool control T-handle 35 extends rearwardly from the reel housing 23 generally aligned with axis 19 and positioned close to the grip 16 so that the spool control T-handle 35 may be easily operated by fingers of a hand of the user 33 holding the grip 16. When not operated by the user, the control T-handle 35 will be in a forward released position as shown.

A single-handled crank arm 30 may extend from a side of the housing 23 to be operated by the user to rotate a crankshaft (not shown in FIG. 1) about axis 32 perpendicular to axis 19. The crank arm 30 may include rotating grips 34 on its end as is generally understood in the art.

In normal use, a reel cowling 36 may attach to the housing 23 to protect and cover an internal winding mechanism (to be discussed below) and to provide a frontward opening 38 through which the fishing line 22 exits generally along the axis 19.

Figure 2:
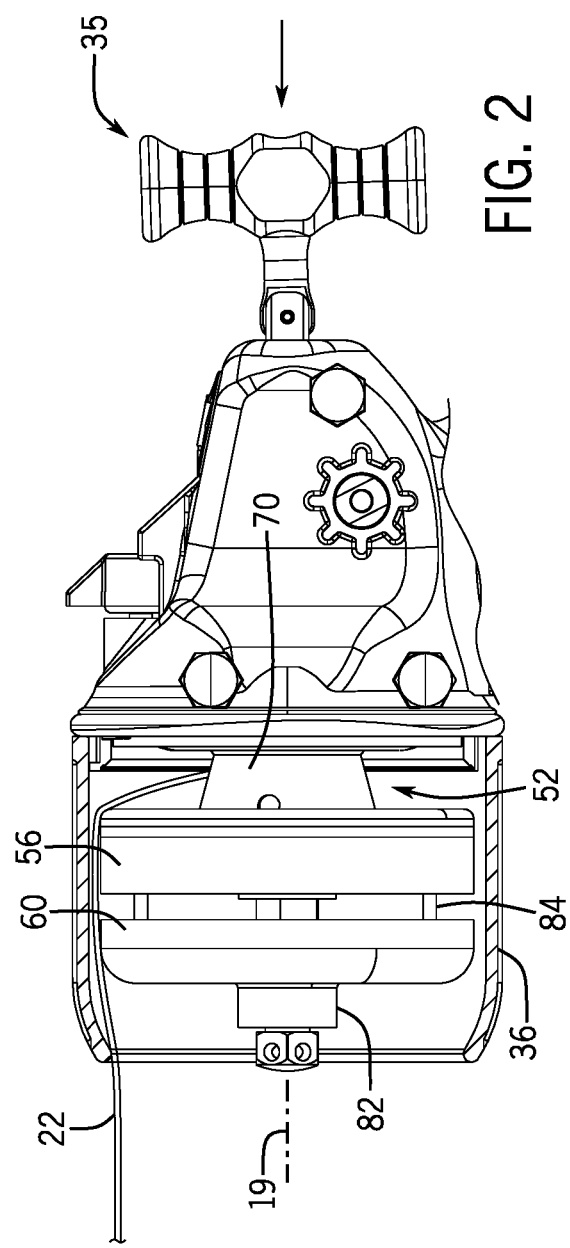
FIG. 2 is a side elevational cross-section of the reel of FIG. 1 showing positioning of the control handle forward in the released position so that the line guide used for winding line around the line spool is retracted and the line spool is free to rotate.
Figure 4:
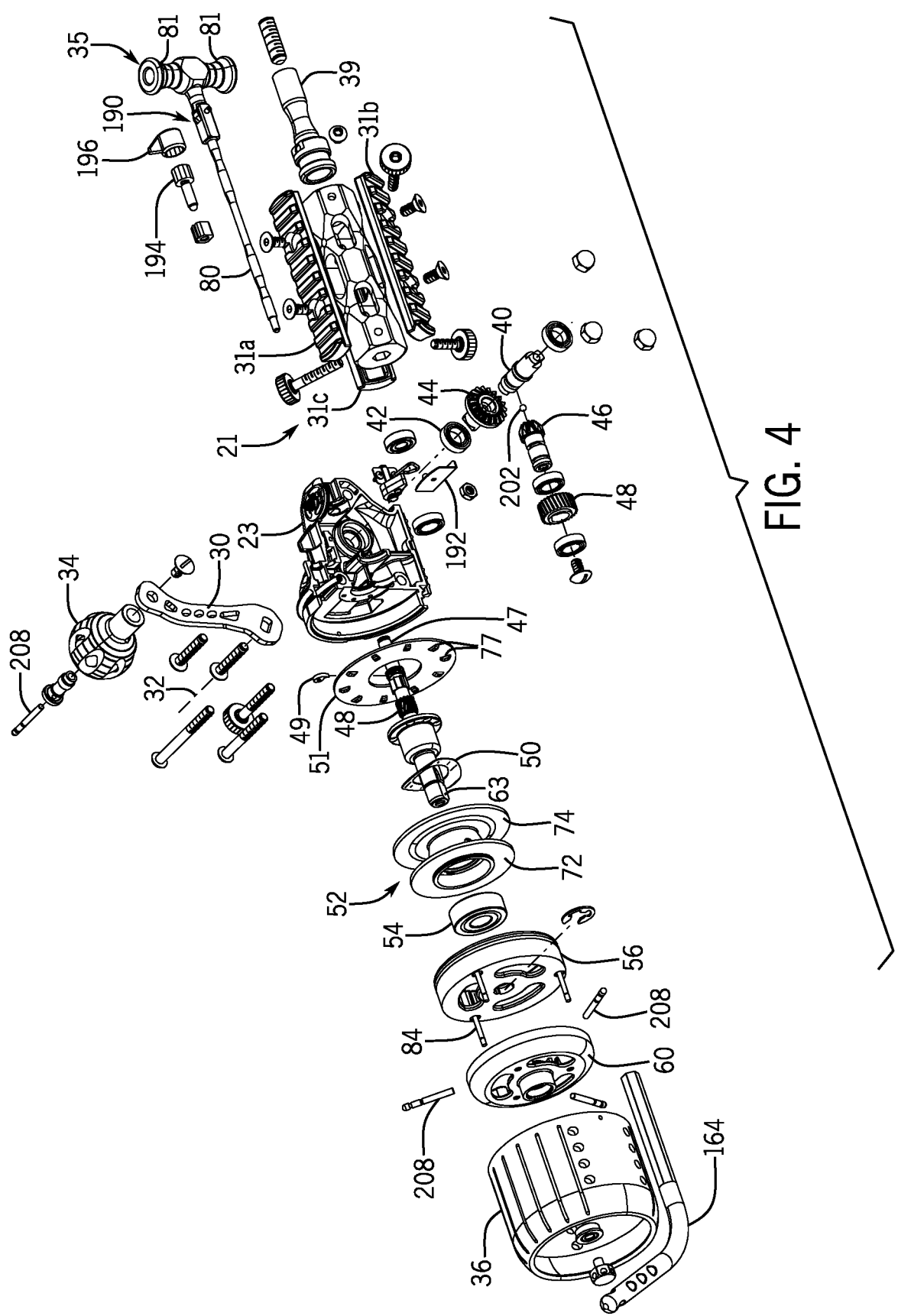
FIG. 4 is a fragmentary exploded view of the mechanism of the reel of FIG. 1 showing operation of the control handle to extend or retract the line guide within a fishing line deflector and showing positioning of a wave washer used to provide a controlled friction clutch and engagement tabs providing a dog clutch between the housing and the line spool.

Referring now to FIGS. 2 and 4, as noted above, the crank arm 30 may attach to a crankshaft 40 extending along axis 32 through a support bearing 42 held in a right side portion of the housing 23. After passing through a ratchet mechanism 45 or similar one-way clutch allowing only clockwise force to be applied to the crankshaft 40 by the crank arm 30, the crankshaft 40 may attach to bevel gear 44. The bevel gear 44 may engage with and drive a smaller pinion gear 46 attached to a shaft 48 formed by inter-engaging gears, the latter turning a shaft 48 extending generally parallel to axis 19 to rotate the shaft 48 with rotation of the crank arm 30 with a step up in rotational rate caused by the gear ratio between bevel gear 44 and smaller pinion gear 46 and the shaft 48. A second ratchet 47 and pawl 49 may be attached to the shaft 48 to augment ratchet 45.

The shaft 48 extends forward from and out of the housing 23 to pass progressively through a tooth plate 51 having teeth 77, a wave washer spring 50, a fishing line spool 52, a bearing 54, a rear fishing line deflector 56, and a front fishing line deflector 60. In this embodiment, the tooth plate 51 is free to rotate as constrained by a friction pad as will be discussed below. A key surface 63 (or other spline-type sliding attachment) on the shaft 48 is received by corresponding key surfaces 64 on the rear and front fishing line deflectors 56 and 60 so that the rear and front fishing line deflectors 56 and 60 rotate with the shaft 48 but are free to slide within a limited range axially along axis 19' with respect to the shaft 48. Forward axial movement of the front fishing line deflector 60 on the shaft 48 is restrained by a stop (not shown).

Each of the front fishing line deflector 60 and rear fishing line deflector 56 provide substantially smooth circular outer peripheries providing a front rim to a spool 52 and may allow the fishing line 22 to slide around axis 19 when paying off of the fishing line spool 52 as will be described below.

The fishing line spool 52 has a generally frustoconical hub 70 tapering to a larger diameter from rear to front (toward the opening 38) and flanked by front and rear radially-extending flanges 72 and 74 which serve to retain coiled fishing line 22 on the hub 70. The flange 72 fits against the rear fishing line deflector 56 which forms a rim to the spool 52 around which the line 22 may pay out. The front edge of the hub 70 may include a hole (not shown) that allows the fishing line 22 to be tied positively to the hub 70 without slipping with rotation of the fishing line spool 52.

The rear flange 72 may include teeth 75 that may engage corresponding teeth 77 on a tooth plate 51 attached to the housing 23 when wave washer spring 50 is fully compressed, this compression allowing the flange 74 to move rearward as will be discussed into engagement with the tooth plate 51.

The T-handle 35 may attach through an opening in the rear of the housing 23 generally aligned with axis 19' and may attach to a through shaft 80 that passes forward through a hollow bore in shaft 48 extending axially through the shaft 48 along axis 19. The through shaft 80 may thus slide smoothly through the hollow bore of the shaft 48 with movement of the T-handle and without interference with rotation of the shaft 48. An end of the through shaft 80 extending through the shaft 48 may be attached to an end cap 82 which may press against the front surface of the front fishing line deflector 60 to provide compressive force along axis 19 without constraining the rotation of the front fishing line deflector 60 when the T-handle is pulled back.

Three line catch pins 84 are embedded in the front fishing line deflector 60 to extend from a rear of the periphery of the front fishing line deflector 60 generally parallel to axis 19 but displaced therefrom at equal angles. The line catch pin 84 may be received within a loose, aligned bore formed in the rear fishing line deflector 56 to slide therethrough. The front fishing line deflector 60 and the rear fishing line deflector 56 may be spring biased apart.

The action of the wave washer spring 50 and spring biasing serves to move the T-handle to the forward released position when it is not pulled back by the user as shown in FIG. 2. In this released position, springs separate the rear fishing line deflector 56 from the front fishing line deflector 60 pulling the line catch pins 84 fully within the rear fishing line deflector 56 so that they may not interfere with a sliding of the fishing line 22 around the smooth, radially symmetrical outer peripheries of the line deflectors 56 and 60 during an unspooling operation. In addition, wave washer spring 50 separates the teeth 77 of the rear flange 74 and teeth 75 of the tooth plate 51 attached to the housing 23 so that the line spool 52 may freely rotate. It will be understood therefore that paying out of the fishing line 22 is facilitated by the ability of the fishing line 22 to pass freely around the fishing line deflectors 56 and 60 in an unwrapping process. In addition, the opening of the cowling 36 is greatly expanded substantially reducing the interference between the cowling 36 and the fishing line 22, and in particular, the deflection of the line 22 caused by any incidental contact between the line 22 and the edge of the opening 38 in the cowling 36 such as produces normal, frictional forces of the type described below.

Figure 3:
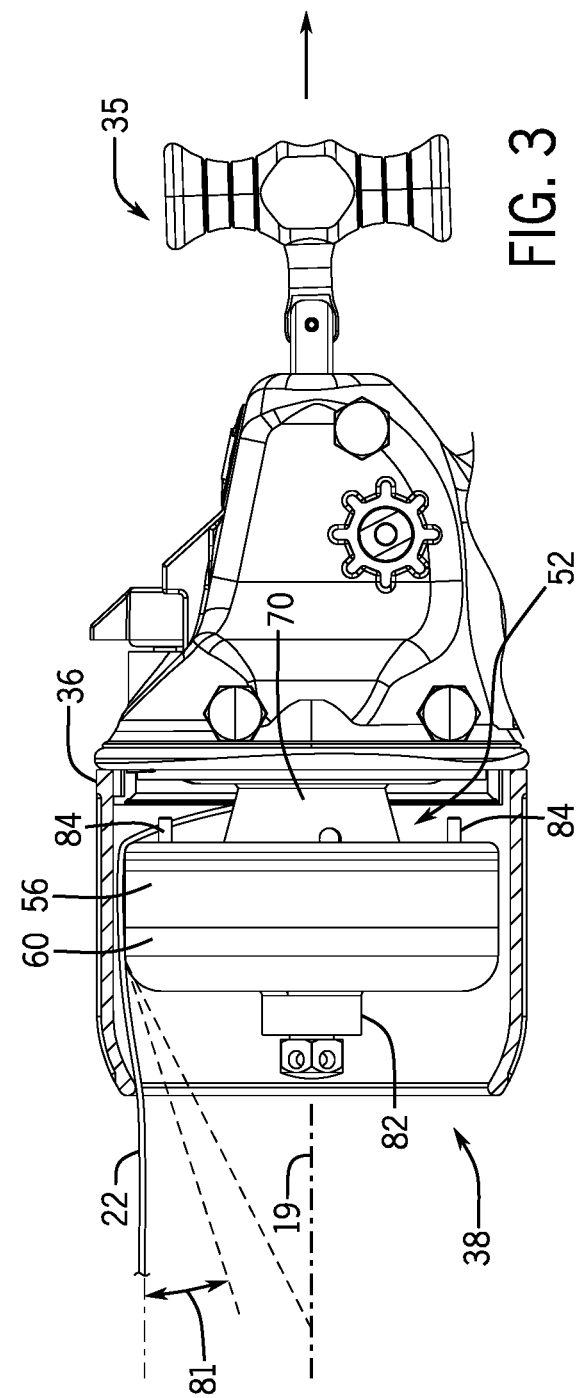
FIG. 3 is a figure similar to that of FIG. 2 showing positioning of the control handle rearward in the actuated position so that the line guide used for winding line around the line spool is extended for engaging the fishing line and the line spool is locked against rotation.

Referring now to FIGS. 3 and 4, with rearward motion of the T-handle by the user, increased force of compression on wave washer spring 50 causes the teeth 75 of the flange 74 to engage teeth 77 of the tooth plate 51 to provide a dog clutch positively locking the two together and providing controlled friction with rotation of the tooth plate 51 that will be described below.

Referring still to FIGS. 3 and 4, retraction of the T-handle rearward to the actuation position also provides an extension of the line catch pins 84 from a rear surface of the rear fishing line deflector 56 so that they may catch the fishing line 22 and, with rotation driven by the crank arm 30, wrap the fishing line 22 around the fishing line spool 52 which is now held in a locked position. Control of the tension of the fishing line 22 will be a function of frictional restraint of the line spool 52 (described below) and prevention of rotation of the rear and front fishing line deflectors 56, the latter effected through the user control of the crank arm 30.

Referring momentarily again to FIG. 1, during use, an arrow slide on an arrow (not shown but as depicted in U.S. Pat. No. 6,517,453 hereby incorporated by reference) will be attached to a free end of the fishing line 22 and engage with the bowstring, for example, held by the user's right hand (assuming a right-handed user and bow) while the user's left hand holds the grip 16. The user's fingers will be free of the T-handle and thus when the arrow is released the fishing line 22 will be able to pay out at rapid speed. For retrieval of the arrow and fishing line 22, the user may simply extend the fingers of the hand of the user 33 holding the bow to engage the T-handle and pull it back to extend the pins 84. The user's right hand will then be able to operate the crank arm 30. By simultaneous control of the crank arm 30 and the T-handle tensioning, retraction of the fishing line may be flexibly controlled.

Referring again to FIGS. 1 and 4, the T-handle may be a handle providing wings 81 extending in opposite directions perpendicularly to shaft 80 to each receive one or more fingers of the user 33 on either side of the shaft 80 to provide for a centered retraction force. The surface of the wings 81 toward the reel 20 may be arcuate for improved comfort and finger centering at equal distance from the shaft 80.

Referring now to FIGS. 1, 2, 3 and 5, the reel cowling 36 may provide for a front opening diameter 160 through which the line 22 may pass that is substantially equal to the outside diameter 162 of the line deflectors 56 and 60 forming a front rim of the spool 52. The front opening diameter 160 is preferably equal to the outside diameter 162 of the line deflectors 56 and 60 (plus or minus 10 percent) and generally greater than 1.5 inches or greater than two inches and preferably equal to substantially at least 2.5 inches. The diameter 160 may be at least 50 percent of the outside diameter 163 of the cowling 36 or greater than 80 percent of this outside diameter 163 which may be substantially three inches in diameter. When the line 22 is pulled tight to extend parallel to axis 19, it may be deflected by the cowling 36 by less than a deflection angle 81 of 20 degrees. Ideally there will be substantially no deflection of the line 22 in these situations.

An outrigger arm 164 may extend forward from the mounting fixture 21 stationary with respect to the bow fishing reel 20 during use and bend upward to intersect the axis 19. At that intersection, the outrigger arm 164 may have an opening 166 generally aligned along axis 19 with the shaft 80 of the reel 20. The opening 166 is displaced forward from the reel 20 such that when the line 22 is pulled tight through the aperture 166 and against an outer periphery of the line deflector 60, the line is free from contact with the cowling 36.

When the line 22 extends from the aperture 166 forward along axis 19 and is pulled tight, it has a deflection before and after aperture 166 that subtends an angle 170 greater than 135 degrees and preferably substantially equal to 155 degrees. A corresponding angle of deflection occurs as the line 22 passes over the edge of the line deflector 60 from a line trajectory generally parallel to axis 19 to a trajectory deflected inward toward the opening 166. The deflection angle is an angle of less than or equal to 180 degrees measured in the plane of deflection.

Referring now also to FIG. 6a, by making these subtended angles 170 closer to 180 degrees, the normal force of the line 22 on the aperture 166 or edge of the line deflector 60 is reduced reducing friction. For given opposed tension forces 172 directed along the line 22, a reduced cross axial normal force 174 is produced. The cross axial force 174 is relevant (generally proportional) to the frictional force of contact between the line 22 and the aperture 166 or against the line deflector 60 as illustrated by vector decomposition of these forces in this figure. The large angle 170 is promoted by increasing the distance 176 between the last point of contact between the line 22 and the line deflector 60 and a point of contact between the line 22 and the aperture 166 when compared to the typical separation distance 178 between the last point of contact between the line 22 and the line deflector 60 and the edge of the cowling 36. This latter distance 178 occurs in reels where the line 22 is constrained by an opening in the cowling 36. In this latter case, much smaller subtended angles 180 are provided at the deflection points of the line 22 causing much higher cross axial forces 182 greatly increasing frictional contact between the line and its guiding members of the line deflector 60 and aperture 166. These smaller angles 180 also place higher forces on the cowling 36 such as may deform the cowling 36 or require that it be made of heavier material undesirable to the extent that it increases the overall weight of the bow. In a similar manner, the reduced deflection of the line 22 shown in FIG. 3 provides reduced frictional normal force.

Referring again to FIG. 5, a connection between the shaft 80 extending rearward from the housing 23 and the T-handle 35 may be a pivoting connection 190 allowing an axis of symmetry 193 of the T-handle 35 to be deflected upward or downward by approximately 20 degrees. This motion allows the T-handle 35 to equalize force between fingers of the user placed on either side of the T-handle 35 to accommodate slight changes of the height of the user's grip on the bow grip 16 shown in FIG. 1.

Figure 5:
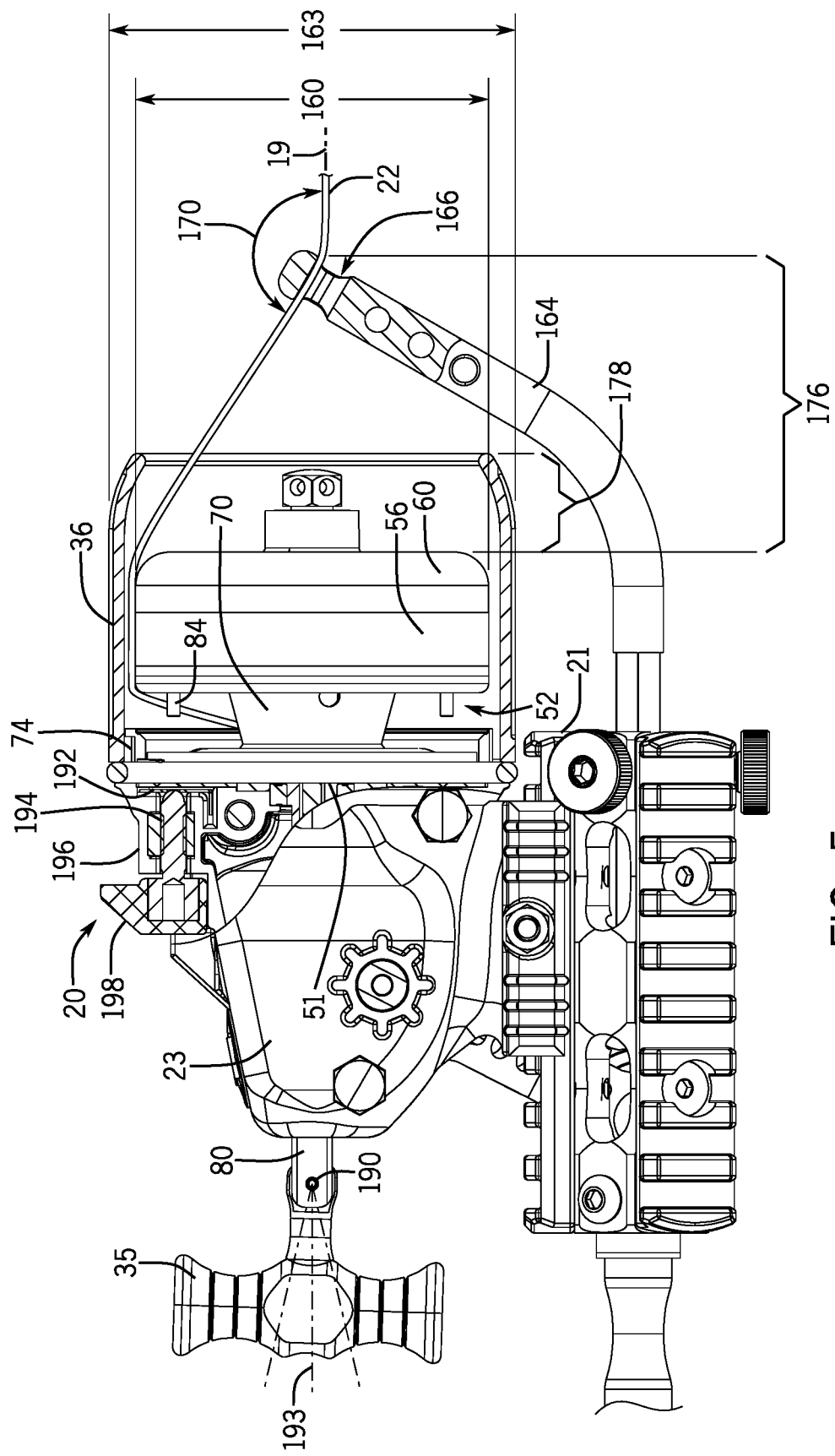
FIG. 5 is a partial elevational cutaway of the reel of FIG. 1 showing dimensions of the wide cowling aperture and a front-extending outrigger arm for improved payout and reduced friction and cross axial forces on the cowling.
Figure 8:
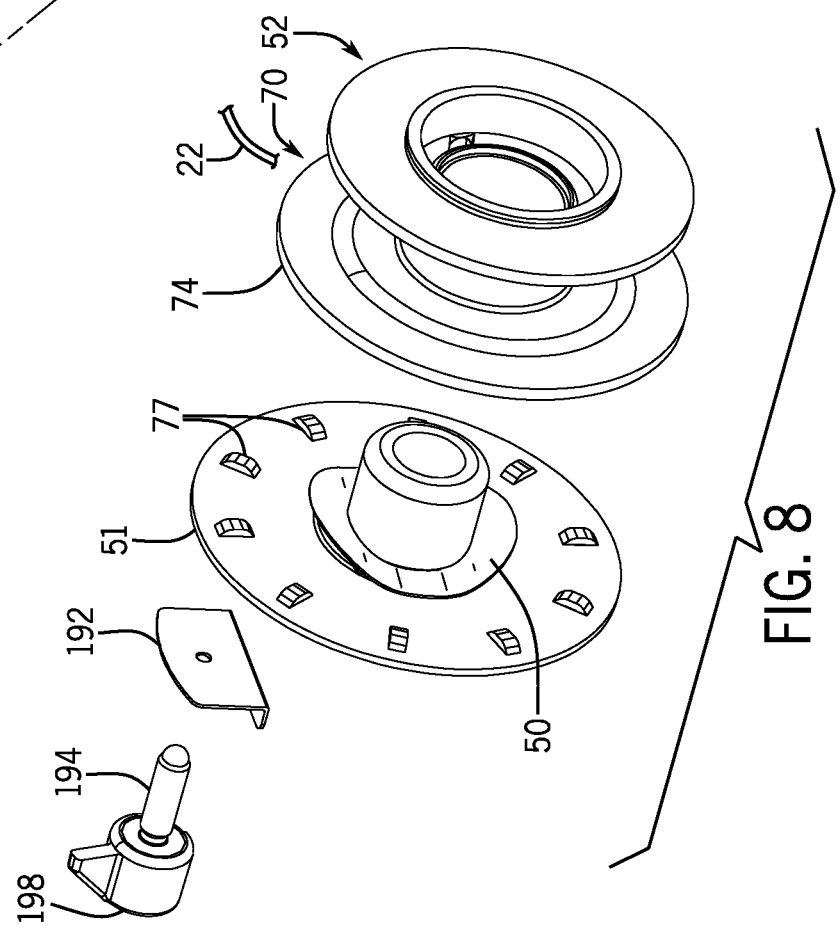
FIG. 8 is a fragmentary perspective view of the reel, tooth plate and friction pad used to provide simple control of tension on the line.

Referring now to FIGS. 5 and 8, when the spool 52 is pulled backward against the force of the wave washer 50 so that the teeth 75 of the tooth plate 51 engage corresponding recesses in the rear surface of the flange 74 of the spool 52, the spool 52 and the tooth plate 51 will rotate together, for example, with winding of the line 22 around the hub 70. A frictional resistance on the movement of the tooth plate 51 may be imposed by means of a friction plate 192 slidably abutting a rear face of the tooth plate 51. As so positioned, the friction plate 192 rubs against the tooth plate 51 with a normal force controlled by a threaded shaft 194 pressing the friction plate 192 against the rear surface of the tooth plate 51. The force imposed by the threaded shaft 194 may be adjusted by rotating the threaded shaft 194 within a threaded collar 196 fixed with respect to the housing 23. An operator knob 198 attached to an outer end of the threaded shaft 194 may be accessible to the user to allow adjustment of this compression force and hence a frictional constraint on the rotation of the spool 52 when it is locked to the tooth plate 51. The threaded shaft 194 may include coarse threads allowing for 360 degree or less, or substantially 180 degree, rotation of the operator knob 198 to move the T-handle 35 between the actuated position, permitting the spool 52 and the tooth plate 51 to rotate together for winding of the line 22, and unactuated position, where the spool 52 and the tooth plate 51 do not rotate together for line pay out. It is understood that the less than 360 degree rotation of the operator knob 198 may assist the user in switching quickly between winding and spooling modes when in use.

Figure 7:
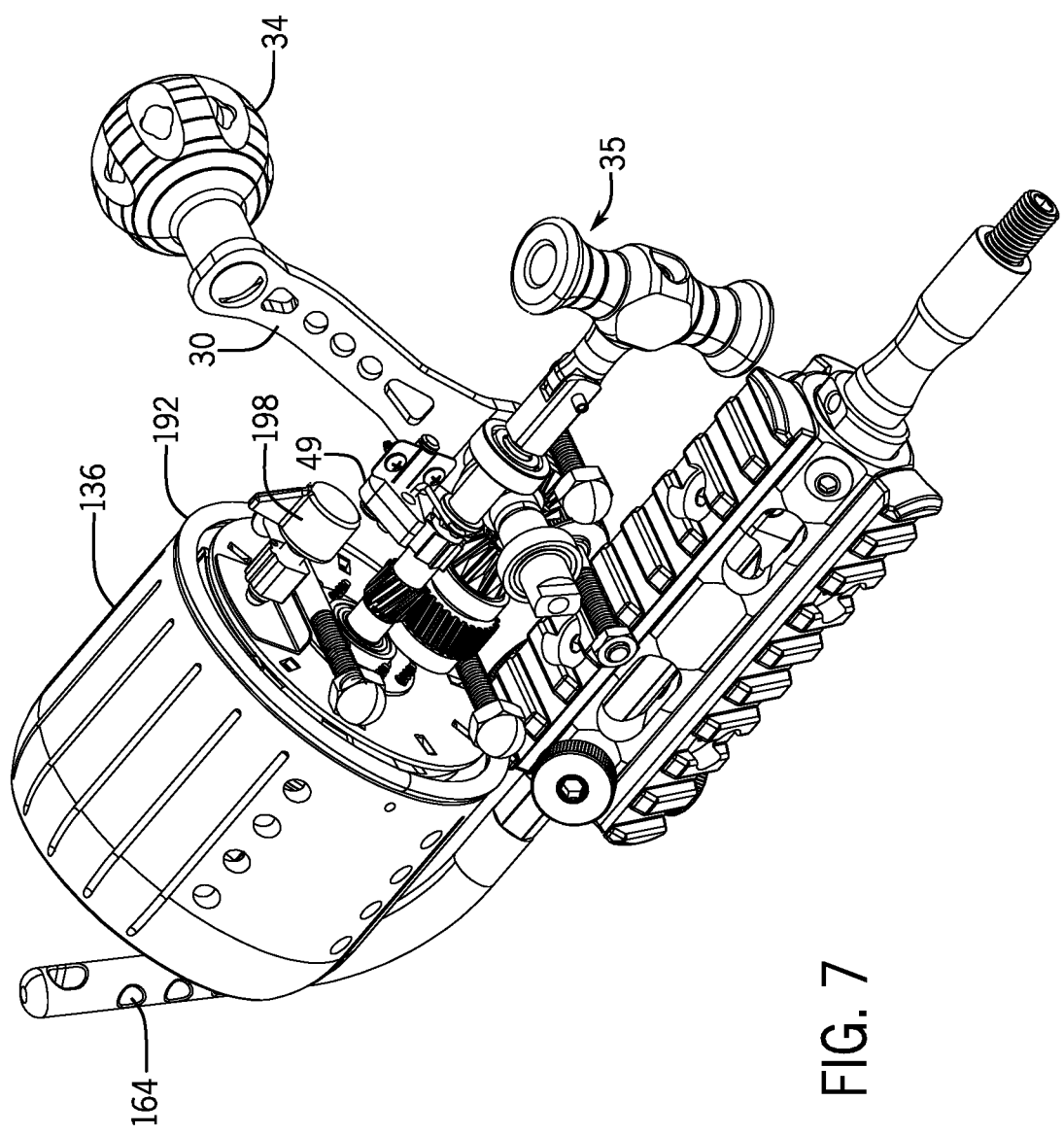
FIG. 7 is a rear perspective view of the reel of FIG. 1 with the housing removed to show the inner gear train.
Figure 9:
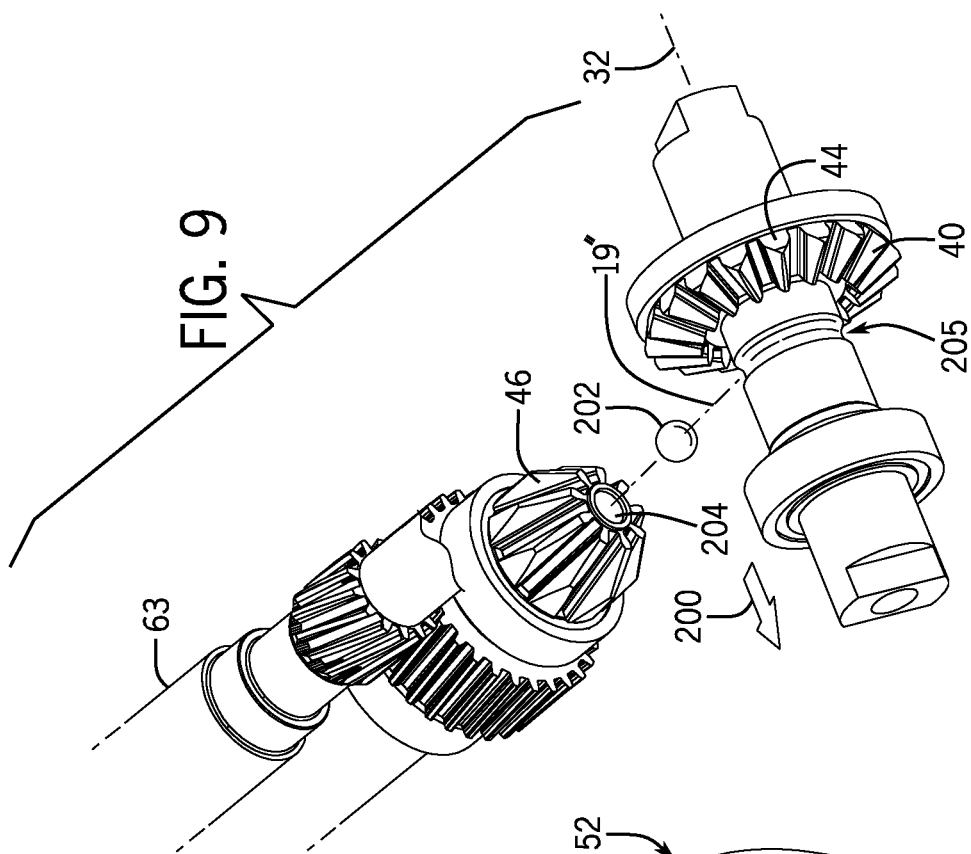
FIG. 9 is an exploded perspective view of the bevel gears interconnecting the crank of the reel to the reel driveshaft by a floating ball and track joint.

Referring now to FIGS. 7 and 9, bevel gears 46 and 44 rotate along mutually perpendicular and intersecting axes 32 and 19", (the latter generally parallel to axis 19). Because of the close proximity of bevel gears 46 and 44 necessary for their inter-engagement, normally one of these gears must be supported in cantilevered fashion, in this case bevel gear 44. Additional support against deflection of bevel pinion gear 46 against disengaging forces as indicated by arrow 200 moving the bevel pinion gear 46 away from bevel gear 44 is provided by a floating support ball 202 that fits within a corresponding hemi-spherical socket 204 in a cantilevered end of bevel pinion gear 46. This support ball 202 supports the bevel pinion gear 46 against forces along arrow 200 by also being constrained in a hemi-circular groove 205 in crankshaft 40 associated with bevel gear 44. In this way bevel pinion gear 46 may be supported by crankshaft 40 despite relative motion of these two components.

Figure 11:
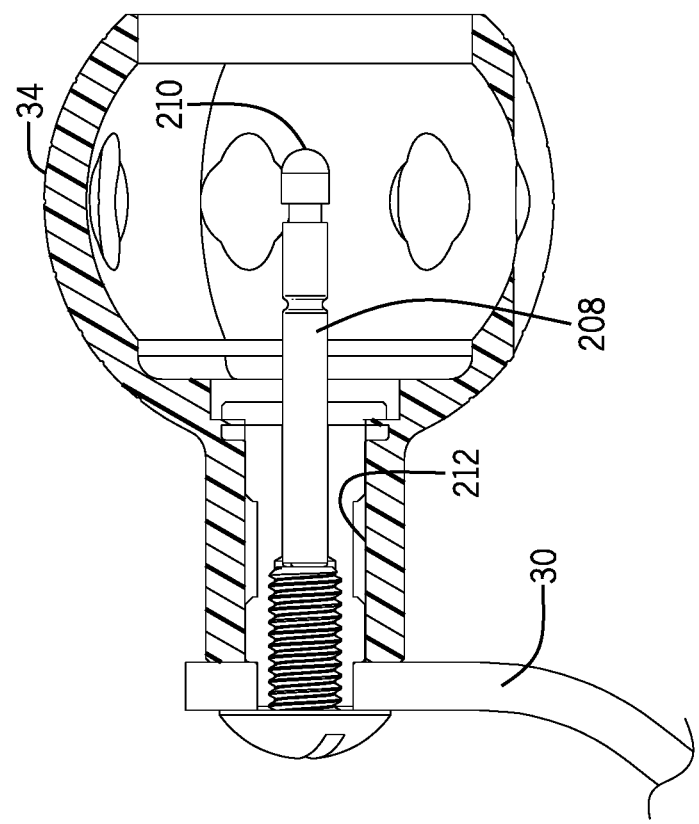
FIG. 11 is a cross-sectional view of the crank handle also receiving a light stick for illumination thereof.
Figure 10:
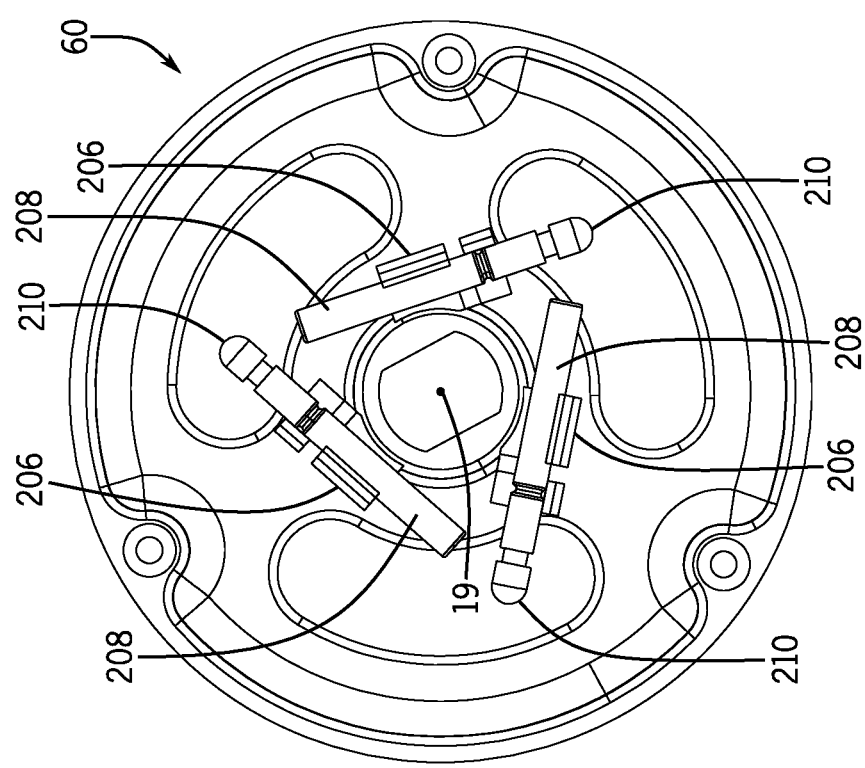
FIG. 10 is an end view of the reel showing slots for engagement of LED light sticks for illuminating the reel.

Referring now to FIGS. 10 and 11, improved use of the reel 20 at night may be provided by placing insertion slots 206 in the front face of line deflector 60, for example, tangentially oriented at three locations separated by 120 degrees about axis 19. These slots 206 may receive, for example, by snap fit, corresponding light sticks 208 having a body incorporating a switch and battery and at one end exposing an LED lamp 210. Light sticks 208 suitable for this purpose are commercially available from a variety of sources and are sold for use in fishing bobbers and for lighting archery nocks. Placement and viewing of the light sticks 208 is facilitated by the substantial opening size of the cowling 36 (shown in FIG. 8).

As shown in FIG. 11, the grip 34 may be hollow and either an opaque or transparent or translucent material and may include a socket 212 for receiving and holding a light 208 for illuminating that grip 34.

Figure 12:
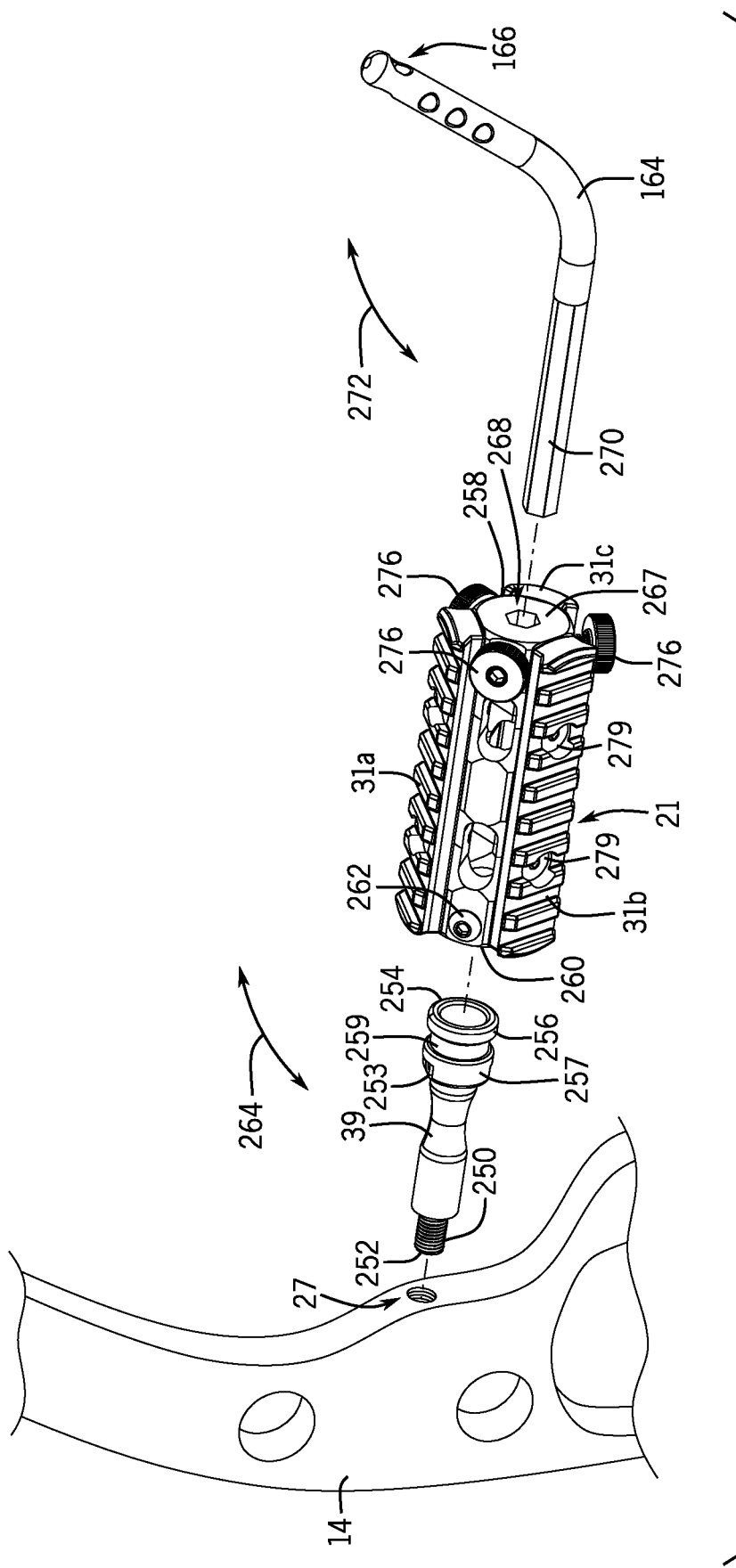
FIG. 12 is a fragmentary exploded view of the mounting fixture of the adjustable mounting system attached to the bow and supporting a keyed outrigger arm.
Figure 13:
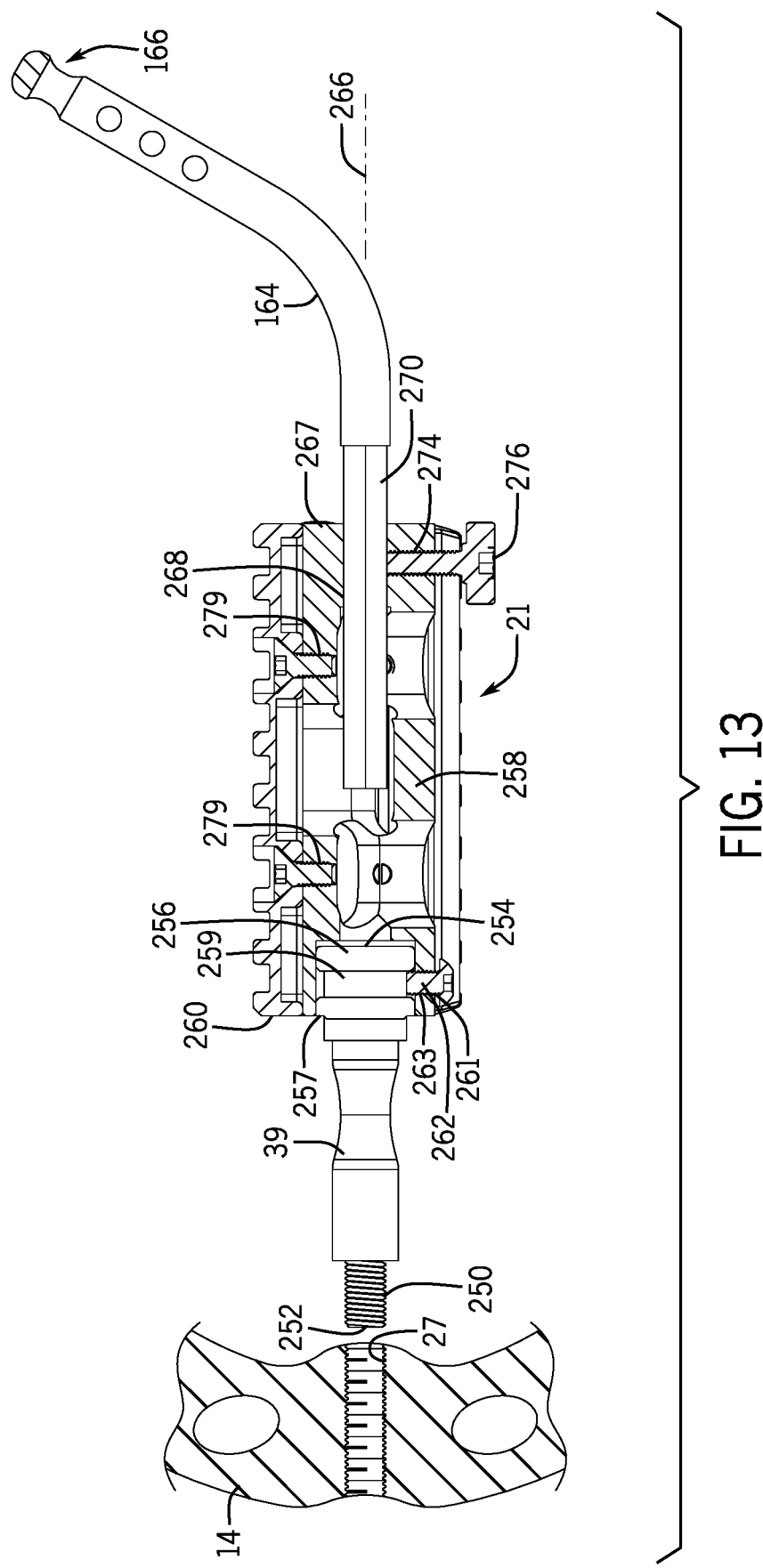
FIG. 13 is a cross-sectional view of the mounting system showing the provision of a hex head screw attachment of the outrigger arm to the mounting fixture and set screw attachment of the mounting fixture to the mounting bushing.

Referring to FIGS. 12 and 13, the mounting fixture 21 may be attached to the mounting bar 39 extending forward from the riser 14 and attached to the riser 14 by means of a threaded bore 27 extending through the riser 14. The mounting bar 39 may include a threaded cylindrical end 250 received by the corresponding threads of the threaded bore 27 of the riser 14 at a first end 252 and have a second end 254 with a cylindrical bushing 256 axially aligned with an axis of the cylindrical end 250 and received by a correspondingly sized axially-aligned cylindrical threaded bore 27 in the mounting fixture 21. The bushing 256 may be separated from a similarly sized collar 257 spaced inwardly along the axis from the second end 254 and second bushing 256 of the mounting bar 39 and forming a notch area 259 therebetween of reduced diameter. The collar 257 may have opposed, flattened outer edges 253 of the collar 257 facilitating the tightening of the mounting bar 39 into the threaded bore 27 by a wrench. The mounting bar 39 is generally circular in cross section.

The mounting fixture 21 may include a support tube 258 having, as noted above, a cylindrical bore 263 with an inner diameter substantially equal to the outer diameter of the bushing 256 and collar 257 so that these elements may interconnect. The bushing 256 and collar 257 may rotate within the cylindrical bore 263 to the desired alignment. After alignment, the cylindrical bore 263 receives the mounting bar 39, the mounting fixture 21 to be retained on the mounting bar 39 on a first end 260 by means of threaded axial holes 261 receiving set screws 262, thumb screws, or the like, the latter that may be tightened against the notch area 259 to provide compression force between the mounting fixture 21 and the mounting bar 39 and prevent rotational movement 264 therebetween, and may be loosened to allow rotational movement 264 about the axis 266 of the mounting bar 39. In this way the mounting fixture 21 may be positioned rotationally so that the desired picatinny rail 31*a*-31*c* is oriented to support the reel housing 23 such that the handle 35 of the reel housing 23 is aligned with the user's fingers when the reel housing 23 is coupled to the mounting fixture 21 and the user 33 is holding the grip 16 (see also FIG. 1).

Figure 14:
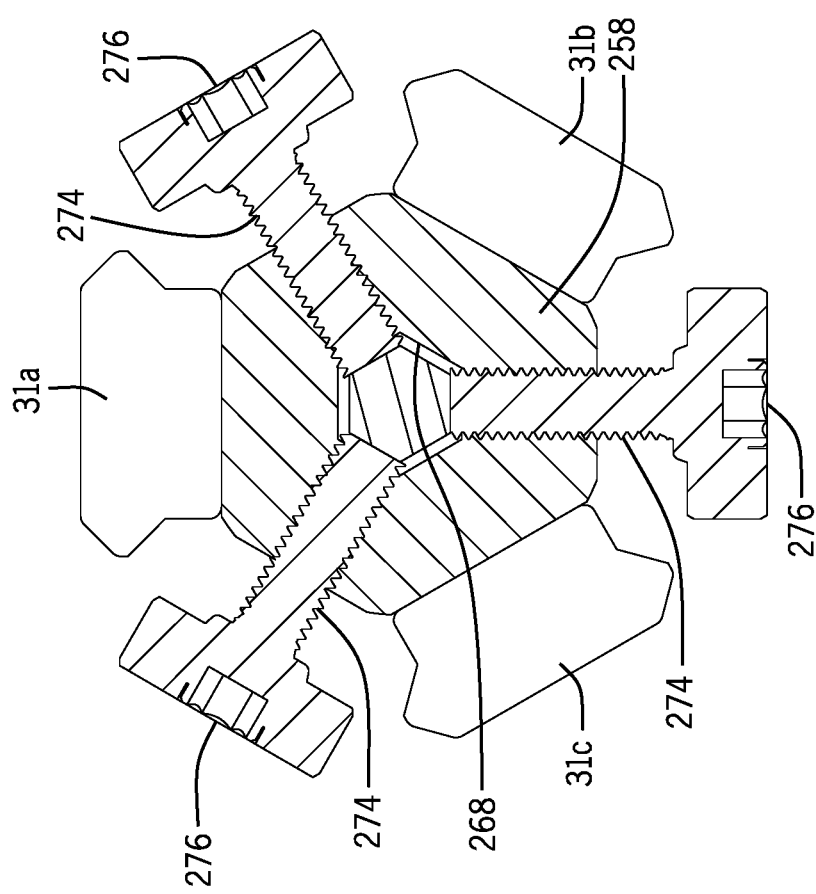
FIG. 14 is an end elevational view of the mounting fixture of FIG. 12 showing the hex hole receiving thumb screws or the like that may be loosened to allow for removal of the outrigger arm from the mounting fixture.

Referring also to FIG. 14, the support tube 258 of the mounting fixture 21 may have an inner diameter at a second end 267, opposite the first end 260, receiving the outrigger arm 164, opposite the mounting fixture 21, to be retained on the outrigger arm 164. The outrigger arm 164 may extend forward from the mounting fixture 21 stationary with respect to the bow fishing reel 20 by means of a hex bore 268 extending within the mounting fixture 21. The outrigger arm 164 may include a hexagonal end 270 having a hexagonal cross section received by the corresponding hex bore 268 of the mounting fixture 21 and preventing rotational movement 272 therebetween. In this way the outrigger arm 164 is locked in rotational alignment such that the outrigger arm 164 is bent upward to intersect axis 19 and the opening 166 is generally aligned along axis 19 with the shaft 80 of the reel 20 (see also FIG. 1).

It is understood that the hexagonal end 270 and corresponding hex bore 268 may be replaced with other keyed alignments so as to lock the rotational alignment therebetween. For example, the key alignment may include a sunk key, parallel key, Woodruff key, tapered key, key seating by broaching, bore with triangle cross section, and the like. The key alignment may allow for rotational alignment of the reel 20, and the respective picatinny rail 31*a*-31*c*, so that the opening 166 is generally aligned along axis 19 with the shaft 80 of the reel 20. For example, it may be desired for an upper surface of one of the picatinny rails 31*a*-31*c* to be parallel with payout axis 19'.

The support tube 258 may include threaded axial holes 274 receiving thumbscrews 276 or the like that may be manually tightened to provide a compression force against the outrigger arm 164 to secure the outrigger arm 164 to the mounting fixture 21 and prevent telescoping movement along axis 266 therebetween and may be loosened to allow the outrigger arm 164 to be removed from the mounting fixture 21.

The mounting fixture 21 may hold the three picatinny rails 31*a*-31*c* of varying heights and supporting the lower clamp jaws 26 of the reel housing 23 by means of threaded bores 279 extending through the picatinny rails 31*a*-31*c*. The mounting fixture 21, picatinny rails 31*a*-31*c*, and lower clamp jaws 26 may be as generally described in U.S. patent application Ser. No. 15/190,595, hereby incorporated by reference.

It is understood that in use, for example, in the field, the mounting fixture 21 may be rotated in order to accommodate a different user using the same bow fishing bow 10. The mounting fixture 21 may be rotated with respect to the mounting bar 39 in order to re-position the upper surface of the desired picatinny rails 31*a*-31*c* in the upward facing position. The desired picatinny rail 31a-31c may be chosen to elevate or lower the height of the reel housing 23, for example, according to the size of the user's hand. The outrigger arm 164 may then be removed from the hex bore 268 and rotated such that the outrigger arm 164 bends forward and upward, the hex bore 268 assisting with rotational alignment of the outrigger arm 164. The reel housing 23 may also be moved forward or backward with respect to the lower clamp jaws 26 or with respect to the mounting fixture 21 without adjusting the position of the mounting fixture 21.

Referring to FIG. 15, it is contemplated that the picatinny rails 31a-31c of the mounting fixture 21 may attach additional accessories including, for example, a laser 280, a flashlight 282, a line puller 284, and a camera 286, having similar lower clamp jaws 26 as the reel housing 23 described above coupled to the threaded bores 279 of the picatinny rails 31a-31c. The mounting fixture 21 may attach multiple of the reel housing 23 and/or the additional accessories at the same time during use with the existence of multiple picatinny rails 31a-31c available for mounting.

The construction of the present invention allows it to be sold with the mounting fixture 21 alone for attachment to a pre-existing bow fishing bow 10, or as a kit with the mounting fixture 21 being sold with the fishing line reel 20 and/or additional bow fishing accessories to be attached to a pre-existing bow fishing bow 10.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A mounting assembly for attaching components to a bow comprising:
   a mounting fixture providing a first axial bore at a first end and a second axial bore at a second end;
   a bar adapted to attach to the bow to extend from the bow to be received within the first axial bore for rotation therein;
   a guide arm slidably received within the second axial bore of the mounting fixture so that the guide arm may extend from the mounting fixture generally parallel to an axis of the second axial bore;
   clamping elements in a released state allowing rotation of the mounting fixture with respect to the bow around the axis of the first axial bore; and
   at least one key element preventing rotation of the guide arm with respect to the mounting fixture around the axis of the second axial bore.

2. The mounting assembly of claim 1 wherein the at least one key element is provided by a non-circular shape of the second axial bore.

3. The mounting assembly of claim 2 wherein the second axial bore is a hex bore receiving a corresponding hexagonal end of the guide arm.

4. The mounting assembly of claim 1 further including second clamping elements in a released state allowing telescoping movement of the guide arm with respect to the second axial bore along the axis of the second axial bore.

5. The mounting assembly of claim 4 wherein the second clamping elements are thumb screws which may be manually loosened or tightened.

6. The mounting assembly of claim 1 wherein the bar has a threaded end received within a threaded bore of the bow.

7. The mounting assembly of claim 6 wherein the bar has a bushing end received within the first axial bore.

8. The mounting assembly of claim 1 wherein the clamping elements are screws tightened to prevent rotational movement between the bar and the mounting fixture.

9. The mounting assembly of claim 1 wherein the mounting fixture further includes axially extending picatinny rails angularly spaced about the second axial bore and receiving a corresponding clamping element allowing repositioning of the clamping element at different axial locations about the mounting fixture.

10. The mounting assembly of claim 9 wherein three picatinny rails extend at three different axial locations about the axial bore and the at least one key element positions the picatinny rails at three different axial locations about the mounting fixture.

11. The mounting assembly of claim 1 further including a kit further including an accessory configured to attach to the mounting fixture, the accessory including at least one of the following: a fishing line reel, a laser, a light, a line puller, and a camera.

12. The mounting assembly of claim 1 further comprising a fishing line reel including:
   a frame adapted for attachment to the mounting fixture;
   a line spool rotatable with respect to the frame about a first axis to wind fishing line on the line spool around the first axis;
   a winder having a crank arm rotatable by a user to rotate the line spool around the first axis;
   a cowling supported by the frame and surrounding the line spool, the cowling having an opening at a first end to allow payout of the fishing line along the first axis;
   a line catch for catching the fishing line to wind the fishing line about the line spool with rotation of the crank arm when the line catch is in an engaged position and for freeing the fishing line so that the fishing line does not wind about the line spool with the rotation of the crank arm when the line guide is in an unengaged position;

a handle extending from a rear of the frame substantially along the first axis and operable by the user to move the line guide from the unengaged position to the engaged position when the handle moves between a released position and an actuated position; and a brake system applying a sliding frictional force to the line spool when the handle is in the actuated position and no sliding frictional force to the line spool when the handle is in an unactuated position, the sliding frictional force being controlled by movement of a user accessible operator;

wherein less than 360 degree of rotation of the user accessible operator moves the handle between the actuated and unactuated positions.

13. The fishing line reel of claim 12 wherein the crank arm is rotatable by a user to rotate the line spool around the first axis in one direction only.

14. The mounting assembly of claim 13 wherein the winder is a one-way clutch.

\* \* \* \* \*